N. H. SMITH.
LAWN SWING.
APPLICATION FILED DEC. 31, 1913.
1,143,454.
Patented June 15, 1915.
2 SHEETS—SHEET 1.
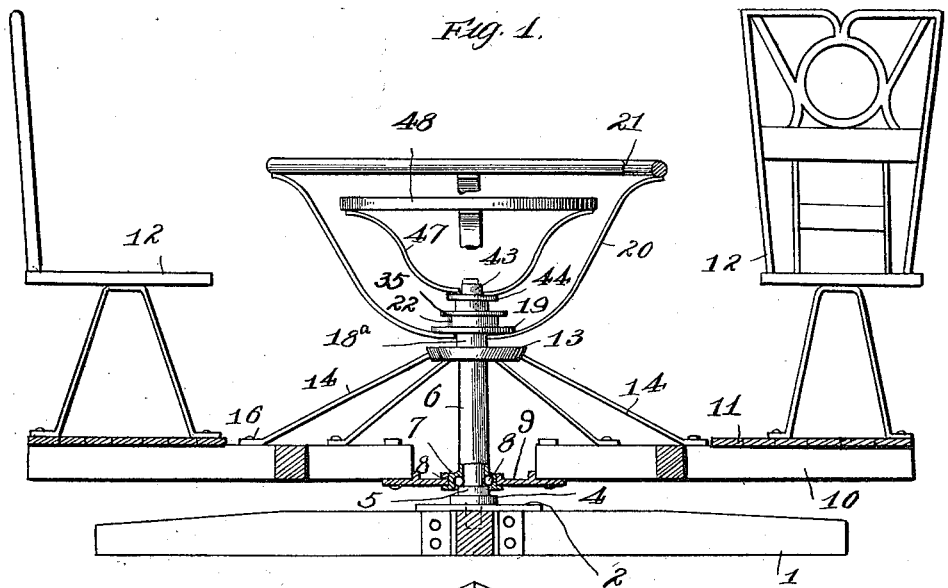

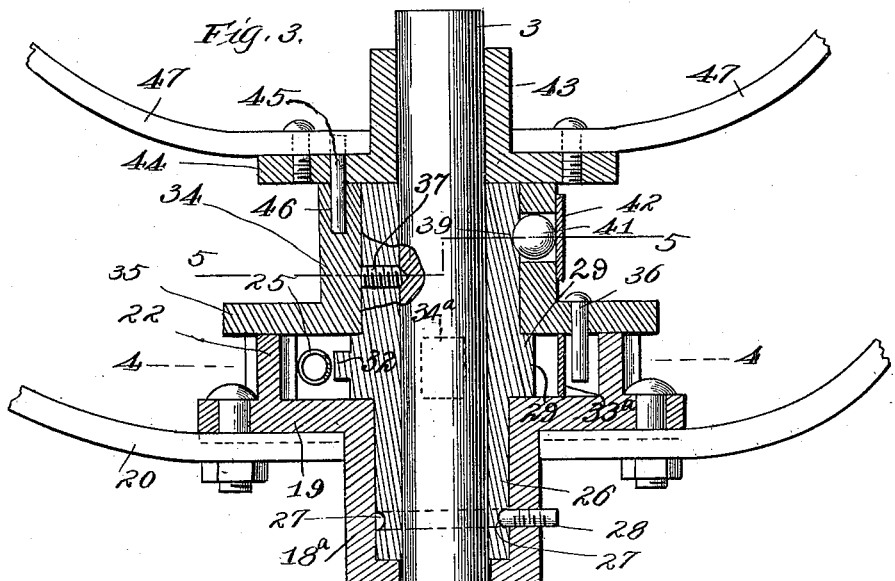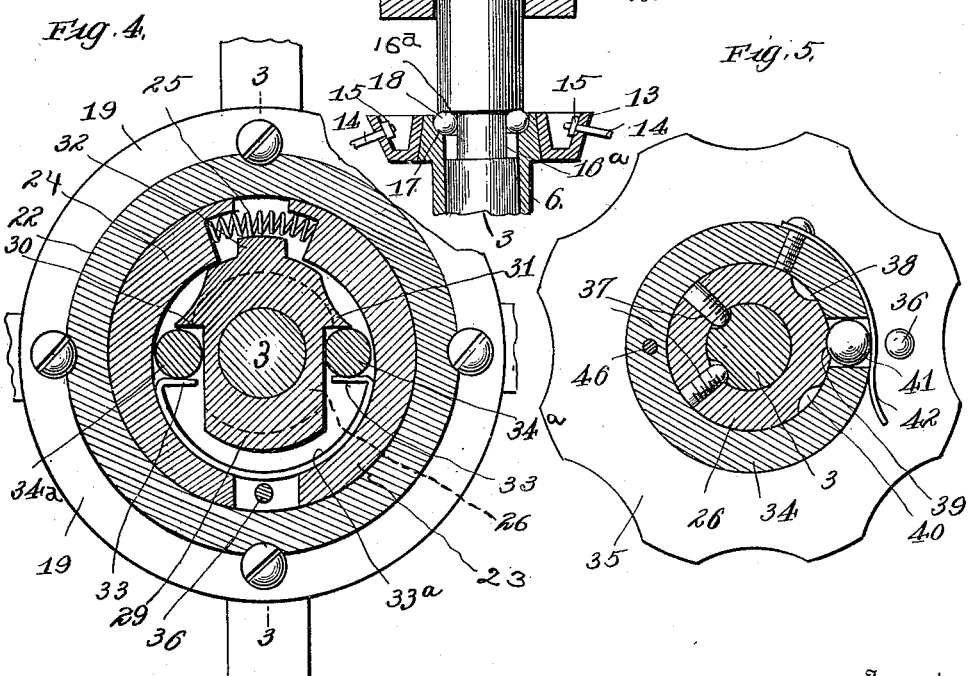

UNITED STATES PATENT OFFICE.

NEWTON H. SMITH, OF HAMILTON, ILLINOIS.

LAWN-SWING.

1,143,454.  Specification of Letters Patent.  Patented June 15, 1915.

Application filed December 31, 1913. Serial No. 809,728.

*To all whom it may concern:*

Be it known that I, NEWTON H. SMITH, a citizen of the United States, residing at Hamilton, in the county of Hancock and State of Illinois, and whose post-office address is Hamilton, Illinois, have invented certain new and useful Improvements in Lawn-Swings, of which the following is a specification.

The object of my invention is to combine with a lawn swing a table and means whereby the swing may be operated or locked against movement, and with this and other objects in view my invention consists of the parts and combination of parts as will be hereinafter pointed out.

In the drawing:—Figure 1 is a vertical longitudinal section through a swing embodying my invention; Fig. 2 is a top plan view of the same; Fig. 3 is an enlarged detail sectional view on the line 3—3, Fig. 4; Fig. 4 is a detail sectional view on the line 4—4, Fig. 3; Fig. 5 is a detail sectional view on the line 5—5, Fig. 3.

The reference numeral 1 designates a base of any suitable construction to which is secured a metal journal box 2, in which the lower end of a vertical shaft 3 is journaled, said shaft having a collar 4.

5 is one member of a ball bearing formed on the shaft 3.

A hub 6 constructed to fit concentrically around the shaft 3 has an enlarged lower end 7 in which is formed a part of a ball bearing coacting with the ball bearing member 5 between which are confined the balls 8.

9 are arms radiating from the enlarged lower end 7 of the hub 6 to which are secured the inner ends of the sleepers 10 on which the platform 11 of the swing is supported. 12 are seats secured to the platform.

The upper end of the hub 6 is provided with a flared collar 13.

14 are tie rods, one end of each of which is secured to the collar 13 by means of the nut 15, while the other end is secured to the sleepers 10 by means of the bolts 16. By means of the nuts 15 proper tension may be given to the rods 14, whereby the sleepers and platform are given an additional point of support from the hub 6.

16$^a$ is a ball bearing formed in the shaft 3 and 17 is a ball bearing formed on the upper end of the hub 6, in which are seated balls 18.

18$^a$ is a sleeve revolubly mounted on the lock sleeve 26 surrounding shaft 3 and this revoluble sleeve is provided with a radial flange 19 to which are secured the arms 20 to which the hand rail 21 is rigidly secured.

22 is an upwardly extending annular flange integral with the flange 19 within which are loosely mounted the clutch jaws or members 23 and 24, the inner faces of which are eccentric to the periphery of the shaft 3. A spring 25 is seated between two adjacent ends of the clutch members 23, 24 whereby they are held normally apart.

26 is a locking sleeve, positioned around the shaft 3 and keyed thereto by means of the screws 37 shown in Figs. 3 and 5, and the lower end of the locking sleeve carries the sleeve 18$^a$, there being a circumferential groove 27 in the locking sleeve, into which a set screw 28 of the sleeve 18$^a$ projects to prevent relative endwise movement between the two sleeves, but at the same time permitting the sleeve 18$^a$ to revolve relatively to the locking sleeve. The locking sleeve 26 has a central flange 29, preferably integral therewith, and flattened on both sides and is provided with abutments 30 and 31 at right angles to its flat sides.

32 is a tongue projecting from the flange 29 into the space between adjacent ends of the clutch jaws 23 and 24 where the spring 25 is positioned as clearly shown in Fig. 4.

33$^a$ is a bow spring positioned between the jaws 23 and 24 terminating at each end in an abutment 33.

34$^a$ are rollers positioned between the flat sides of the flange 29, the clutch jaws 23 and 24, and the abutments 30, 31 and 33.

34 is a collar concentric with and surrounding the upper end of the locking sleeve 26 having a base annular flange 35 which serves as a cap resting on the flange 22 of the sleeve 18$^a$ and serving as a cap for the chamber in which the clutch jaws 23 and 24 are confined.

36 is a pin carried by the cap flange 35 which depends between adjacent ends of the jaws 23 and 24 and is constructed to move said jaws.

37 are set screws keying the locking sleeve 26 to the shaft 3, as already described.

The locking sleeve 26 has a series of clutch seats 38, 39 and 40 near its upper end in which the ball clutch 41 is seated by means of a spring 42 carried by the collar 34. A nipple 43 is revolubly mounted on the shaft 3 and is provided with a base flange 44 which rests upon the end of the collar 34 and is locked therewith by means of the pin 45 which projects into a hole 46 formed in said collar.

47 are arms secured to the base flange 44 of the nipple at one end and are secured at their other ends to the table 48 which they support.

The pin 36 is fastened in the flange 35, which is an integral part of the collar 34. The nipple 43 with the base flange 44 is fastened by the pin 45 to the collar 34, and to this nipple are attached the arms 47 which are attached to the table 48. The table operates the pin 36, and when this pin is pressed against the smaller end of one of the gripping jaws declutches that jaw. When the table is slightly moved in either direction from neutral it causes the pin 36 to operate on one of the respective jaws 23 or 24, and slides that jaw out of clutching position and allows the other jaw to remain in clutching position. When the pin 36 is in neutral position, both of the jaws are pressed against the annular flange 22 causing a slight friction. When the pin 36 is moved on either side of the neutral position, it declutches the jaw on that side and the hand rail can be operated in one direction. As soon as the pin is moved by the table against the other jaw, the hand rail moves in the reverse direction.

The function of the ball clutch is to hold the pin 36 in position when it presses against the small end of one of the jaws 23, 24, and presses that jaw out of clutching engagement and holds it there against the action of the spring 25. When the pin 36 is neutral, the spring 25 holds both jaws pressed against the flange 22. The ball 41 holds the collar 34 in a relatively firm position by the action of the spring 42, causing the ball to drop into the ball seats 38, 39, 40. This clutch is sufficiently rigid to hold the pin in operating position, and yet not so rigid that it cannot be easily moved by a slight force on the table.

The operation is as follows: When the ball clutch 41 is in the position shown in Fig. 5, the pin 36 carried by the revoluble clutch member 34 is in the neutral position shown in Fig. 4. Now by revolving the table, which in turn revolves the nipple 43, the pin 46, carried by the nipple, moves the member 34 in one direction or the other, so that, for instance, the ball 41 is moved counter clockwise into the seat 38, thus locking the member 34 in its adjusted position. Now as the member 34 is thus moved it carries the pin 36 with it and said pin engages the smaller end of the clutch member 23 in this case (or 24 if turned in the opposite direction) and moves the clutch member 23 into unclutched position. With the parts in this position and by giving the hand rail a slight turn also counter clockwise, the jaw 24 in the present instance will wedge between flange 22 and roller 34ª, supported by the flat surface of the flange 29, until the hand rail becomes securely locked. The platform is now revolved by continued pulling in the same direction on the hand rail, which is locked to the shaft. It is however, free to revolve in the opposite direction, in this instance, clockwise, that is, with the platform, so that the operator does not need to let go of the hand rail. He first pulls it, giving impetus to the platform, and if he retains the grip on the rail, the latter will be set moving in the same direction as the platform until he gives the next pull. The clutch jaws 23 and 24 may be operated to release the hand rail by a pull upon the table in the direction opposite to that just designated.

What I claim is:

1. In a swing, the combination with a shaft, a passenger platform freely mounted on said shaft, a table and a hand rail mounted on said shaft, of a clutch operated by said table to clutch the hand rail to said shaft, whereby the passenger may revolve the platform by pulling on the hand rail.

2. In a lawn swing, the combination with a shaft, a platform freely mounted on said shaft, of a hand rail mounted on said shaft, a clutch member mounted on the shaft, and connected with said hand rail, and means to operate said clutch.

3. In a lawn swing, the combination with a shaft, a platform freely mounted thereon, a hand rail, and a table also mounted on said shaft, of a locking sleeve keyed to said shaft and locking means coöperating therewith and connected with the hand rail, a clutch member revolubly mounted on said shaft, means connecting said clutch member with the table whereby upon a turning of the table the clutch is thrown into clutching relation with the shaft and means carried by said clutch to operate said locking means to unclutch the hand rail from the shaft.

4. In a clutch the combination with a shaft, and a clutch member carried by said shaft, a hub, clutch jaws mounted on said hub, rollers interposed between said jaws and said clutch member, means to normally hold the jaws in clutched position, and means to move the jaws out of clutching relation with the clutch member.

5. In a clutch the combination with a shaft, and a clutch member carried by said shaft, a hub, clutch jaws mounted on said hub, rollers interposed between said jaws and said clutch member, means to normally hold the jaws in clutching position, and means to move the jaws out of clutching relation with the clutch member, and still other means to move said jaws to clutching position.

6. In a clutch, the combination with a shaft and a locking sleeve, bearing a clutch member keyed thereto, of a hub revolubly mounted on said locking sleeve and provided with a radially extending flange, and an upwardly extending annular flange, clutch jaws mounted within said annular flange, a spring holding said jaws normally in clutched position, a collar revolubly mounted on said locking sleeve, a pin depending from said collar between adjacent ends of the said jaws, a ball clutch between said collar and said locking sleeve, a nipple mounted on said collar, means connecting said nipple and said collar, means connecting with said hub to move said hub and operating means connected to said nipple.

7. In a clutch the combination with a shaft, a locking sleeve, bearing a clutch member keyed to said shaft, of a hub revolubly mounted on said locking sleeve and provided with a radially extending flange and an upwardly extending annular flange, clutch jaws loosely mounted within said annular flange, a spring interposed between adjacent ends of said jaws and normally holding them in clutched position, abutments extending from said clutch member between the clutch jaws, clutch rollers mounted adjacent the abutment a spring mounted between said rollers, a collar revolubly mounted on said locking sleeve and having a pin depending between the two adjacent ends of the clutch jaws, a ball clutch between the collar and the locking sleeve, a nipple connected to said collar, operating means connected to the said hub and operating means connected to the said nipple.

The foregoing specification signed at Keokuk, Iowa, this 10th day of December, 1913.

NEWTON H. SMITH.

In presence of two witnesses:
WILLIAM C. HOWELL,
F. E. LUTZ.

Copies of this patent may be obtained for five cents each, by addressing the "Commissioner of Patents, Washington, D. C."